(12) United States Patent
Myers et al.

(10) Patent No.: US 10,931,802 B2
(45) Date of Patent: Feb. 23, 2021

(54) ELECTRONIC DEVICES WITH CONCAVE DISPLAYS

(71) Applicant: Apple Inc., Cupertino, CA (US)

(72) Inventors: Scott A. Myers, Saratoga, CA (US); Benjamin M. Rappoport, Santa Barbara, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/863,729

(22) Filed: Jan. 5, 2018

(65) Prior Publication Data

US 2018/0159969 A1 Jun. 7, 2018

Related U.S. Application Data

(63) Continuation of application No. 13/108,256, filed on May 16, 2011, now Pat. No. 9,866,660.

(60) Provisional application No. 61/454,936, filed on Mar. 21, 2011.

(51) Int. Cl.
*G09G 5/00* (2006.01)
*H04M 1/02* (2006.01)
*G06F 1/16* (2006.01)

(52) U.S. Cl.
CPC ........ *H04M 1/0266* (2013.01); *G06F 1/1637* (2013.01); *H04M 1/0268* (2013.01)

(58) Field of Classification Search
None
See application file for complete search history.

(56) References Cited

U.S. PATENT DOCUMENTS

| 4,066,855 A | 1/1978 | Zenk |
| 4,085,302 A | 4/1978 | Zenk et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |

(Continued)

FOREIGN PATENT DOCUMENTS

| CN | 1678945 | 10/2005 |
| CN | 1254665 | 5/2006 |

(Continued)

OTHER PUBLICATIONS

5th Generation iPad nano: A staple of audio players having a video camera installed, having been further perfected, Mac Fan, Japan, Mainichi Communications Inc., Issued Nov. 1, 2009, vol. 17, issue 11, pp. 26 to 29.

(Continued)

*Primary Examiner* — Carl Adams
(74) *Attorney, Agent, or Firm* — Treyz Law Group, P.C.; Kendall W. Abbasi

(57) ABSTRACT

Electronic devices may be provided with concave displays that reduce the risk of damage in the event of a drop while maximizing the internal volume of the device. Concave displays may be formed from one or more flexible layers including a flexible display layer. The flexible display layer may be mounted to a rigid support structure or a rigid cover layer. Flexible display layers that conform to the curved shape of a rigid cover structure provide additional internal volume in which internal components of the device may be positioned.

18 Claims, 7 Drawing Sheets

(56) References Cited

U.S. PATENT DOCUMENTS

| | | | |
|---|---|---|---|
| 5,880,411 A | 3/1999 | Gillespie et al. | |
| 6,035,180 A | 3/2000 | Kubes et al. | |
| 6,067,074 A | 5/2000 | Lueders | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,803,245 B2 | 10/2004 | Auch et al. | |
| 6,879,319 B2 | 4/2005 | Cok | |
| 7,015,894 B2 | 3/2006 | Morohoshi | |
| 7,034,913 B2 | 4/2006 | Ishida | |
| 7,184,064 B2 | 2/2007 | Zimmerman et al. | |
| 7,188,989 B2 | 3/2007 | Miyashita | |
| 7,324,093 B1 | 1/2008 | Gettemy et al. | |
| 7,382,357 B2 | 6/2008 | Panotopoulos et al. | |
| 7,382,890 B2 | 6/2008 | Saiki | |
| 7,541,671 B2 | 6/2009 | Foust et al. | |
| 7,657,042 B2 | 2/2010 | Miyata | |
| 7,663,607 B2 | 2/2010 | Hotelling et al. | |
| 7,714,801 B2 | 5/2010 | Kimmel | |
| 7,834,451 B2 | 11/2010 | Lee et al. | |
| RE42,199 E | 3/2011 | Caldwell | |
| 7,920,223 B2 | 4/2011 | Nishizawa et al. | |
| 8,027,503 B2 | 9/2011 | Konuma et al. | |
| 8,199,124 B2 | 6/2012 | Ciesla et al. | |
| 8,232,976 B2 | 7/2012 | Yun et al. | |
| 2002/0001187 A1 | 1/2002 | Murofushi | |
| 2002/0047952 A1 | 4/2002 | Kawata | |
| 2002/0071082 A1 | 6/2002 | Okita et al. | |
| 2002/0093602 A1 | 7/2002 | Kawata | |
| 2003/0003879 A1 | 1/2003 | Saiki et al. | |
| 2003/0227441 A1 | 12/2003 | Hioki | |
| 2005/0025330 A1 | 2/2005 | Saiki et al. | |
| 2005/0126831 A1* | 6/2005 | Richter | G06F 3/044 178/18.01 |
| 2005/0140646 A1 | 6/2005 | Nozawa | |
| 2005/0226455 A1 | 10/2005 | Aubauer et al. | |
| 2006/0026521 A1 | 2/2006 | Hotelling et al. | |
| 2006/0132025 A1 | 6/2006 | Gao et al. | |
| 2006/0197753 A1 | 9/2006 | Hotelling | |
| 2006/0238494 A1 | 10/2006 | Narayanaswami | |
| 2006/0273304 A1* | 12/2006 | Cok | H01L 51/0096 257/40 |
| 2007/0202917 A1 | 8/2007 | Phelps | |
| 2007/0242033 A1 | 10/2007 | Cradick et al. | |
| 2007/0247422 A1 | 10/2007 | Vertegaal et al. | |
| 2007/0247429 A1 | 10/2007 | Westerman | |
| 2007/0258604 A1 | 11/2007 | Bosnecker | |
| 2008/0060856 A1 | 3/2008 | Shahoian et al. | |
| 2008/0146285 A1 | 6/2008 | Lee et al. | |
| 2008/0158173 A1* | 7/2008 | Hamblin | G06F 1/1684 345/173 |
| 2008/0204367 A1 | 8/2008 | Lafarre et al. | |
| 2008/0260188 A1 | 10/2008 | Kim | |
| 2008/0291225 A1 | 11/2008 | Arneson | |
| 2008/0303782 A1 | 12/2008 | Grant et al. | |
| 2008/0305838 A1 | 12/2008 | Joo | |
| 2009/0015747 A1 | 1/2009 | Nishizawa et al. | |
| 2009/0082103 A1 | 3/2009 | Lube | |
| 2009/0096965 A1 | 4/2009 | Nagata | |
| 2009/0161048 A1 | 6/2009 | Satake et al. | |
| 2009/0167171 A1 | 7/2009 | Jung et al. | |
| 2009/0201443 A1 | 8/2009 | Sasaki et al. | |
| 2009/0219247 A1 | 9/2009 | Watanabe et al. | |
| 2009/0247237 A1 | 10/2009 | Mittleman et al. | |
| 2009/0256471 A1 | 10/2009 | Kim et al. | |
| 2010/0006845 A1 | 1/2010 | Seo et al. | |
| 2010/0026952 A1 | 2/2010 | Miura et al. | |
| 2010/0045705 A1 | 2/2010 | Vertegaal et al. | |
| 2010/0052521 A1 | 3/2010 | Kim et al. | |
| 2010/0060548 A1 | 3/2010 | Choi et al. | |
| 2010/0061039 A1 | 3/2010 | Sanford et al. | |
| 2010/0061040 A1 | 3/2010 | Dabov et al. | |
| 2010/0073593 A1 | 3/2010 | Sasaki | |
| 2010/0079387 A1* | 4/2010 | Rosenblatt | H02S 40/22 345/173 |
| 2010/0110041 A1 | 5/2010 | Jang | |
| 2010/0117975 A1 | 5/2010 | Cho | |
| 2010/0120473 A1 | 5/2010 | Oh | |
| 2010/0162109 A1 | 6/2010 | Chatterjee et al. | |
| 2010/0164888 A1 | 7/2010 | Okumura | |
| 2010/0188422 A1 | 7/2010 | Shingai et al. | |
| 2010/0238367 A1 | 9/2010 | Montgomery et al. | |
| 2010/0238612 A1 | 9/2010 | Hsiao et al. | |
| 2010/0260351 A1 | 10/2010 | Diethorn et al. | |
| 2010/0265187 A1 | 10/2010 | Chang et al. | |
| 2010/0265206 A1 | 10/2010 | Chen | |
| 2010/0315399 A1 | 12/2010 | Jacobson et al. | |
| 2010/0317409 A1 | 12/2010 | Jiang et al. | |
| 2011/0014955 A1 | 1/2011 | Kim et al. | |
| 2011/0037734 A1 | 2/2011 | Wilson et al. | |
| 2011/0050657 A1 | 3/2011 | Yamada | |
| 2011/0074720 A1 | 3/2011 | Ozaki | |
| 2011/0086680 A1 | 4/2011 | Kim et al. | |
| 2011/0134144 A1* | 6/2011 | Moriwaki | G09G 3/3208 345/660 |
| 2011/0186899 A1 | 8/2011 | van Lieshout | |
| 2011/0227822 A1* | 9/2011 | Shai | G06T 3/40 345/156 |
| 2011/0234502 A1 | 9/2011 | Yun et al. | |
| 2011/0261002 A1 | 10/2011 | Verthein | |
| 2012/0105370 A1* | 5/2012 | Moore | G06F 3/044 345/174 |
| 2012/0111479 A1 | 5/2012 | Musser et al. | |
| 2012/0127087 A1 | 5/2012 | Ma | |
| 2012/0211148 A1 | 8/2012 | Patel et al. | |
| 2012/0218219 A1 | 8/2012 | Rappoport et al. | |
| 2013/0135212 A1 | 3/2013 | Cheng et al. | |
| 2014/0002385 A1* | 1/2014 | Ka | H05B 33/22 345/173 |
| 2014/0049500 A1* | 2/2014 | Chen | G06F 3/0445 345/174 |
| 2014/0362020 A1 | 12/2014 | Rothkopf et al. | |
| 2016/0299579 A1* | 10/2016 | Kim | G06F 3/0346 |

FOREIGN PATENT DOCUMENTS

| | | |
|---|---|---|
| CN | 101674361 | 3/2010 |
| CN | 101739171 A | 6/2010 |
| CN | 101782804 | 7/2010 |
| CN | 101963864 B | 3/2013 |
| DE | 10143275 | 4/2003 |
| EP | 0929027 | 7/1999 |
| EP | 1 635 313 | 3/2006 |
| EP | 1827057 | 8/2007 |
| EP | 1 970 886 | 9/2008 |
| EP | 2187443 | 5/2010 |
| EP | 2 192 750 | 6/2010 |
| EP | 2202624 | 6/2010 |
| JP | Hei 6-66969 | 3/1994 |
| JP | 2010171620 | 6/1998 |
| JP | H11-143606 A | 5/1999 |
| JP | 20000163031 | 6/2000 |
| JP | 2000-293117 | 10/2000 |
| JP | 2001061194 | 3/2001 |
| JP | 2001-154592 | 6/2001 |
| JP | 2001189978 | 7/2001 |
| JP | 2001519585 | 10/2001 |
| JP | 2002049021 A | 2/2002 |
| JP | 2002232992 | 8/2002 |
| JP | 2002342033 | 11/2002 |
| JP | 2003-015796 A | 1/2003 |
| JP | 200315795 | 1/2003 |
| JP | 2003125315 | 4/2003 |
| JP | 2003179988 | 6/2003 |
| JP | 2003-211087 | 7/2003 |
| JP | 2003211087 | 7/2003 |
| JP | 2003-208548 | 10/2003 |
| JP | 2003280546 | 10/2003 |
| JP | 2004069627 A | 3/2004 |
| JP | 2004173264 | 6/2004 |
| JP | 2005-091873 | 4/2005 |

(56) References Cited

FOREIGN PATENT DOCUMENTS

| | | |
|---|---|---|
| JP | 2005-099159 A | 4/2005 |
| JP | 2005110216 | 4/2005 |
| JP | 2006-005712 A | 1/2006 |
| JP | 2006270834 | 10/2006 |
| JP | 2007-41985 | 2/2007 |
| JP | 2007-072375 A | 3/2007 |
| JP | 2007-264923 A | 10/2007 |
| JP | 2007-272107 | 10/2007 |
| JP | 2008083491 | 4/2008 |
| JP | 2008-530611 A | 8/2008 |
| JP | 2008-234549 | 10/2008 |
| JP | 2008233779 | 10/2008 |
| JP | 2008283350 | 11/2008 |
| JP | 2009-020168 A | 1/2009 |
| JP | 2009-086560 A | 4/2009 |
| JP | 2009194223 | 8/2009 |
| JP | 2009-205565 | 9/2009 |
| JP | 2010-008480 | 1/2010 |
| JP | 2010-095659 A | 4/2010 |
| JP | 3159716 | 5/2010 |
| JP | 2010-157060 | 7/2010 |
| JP | 2010153813 | 7/2010 |
| JP | 2010-529555 A | 8/2010 |
| JP | 2010-191246 | 9/2010 |
| JP | 2010-152888 | 10/2010 |
| JP | 1400563 | 11/2010 |
| JP | 2010251304 A | 11/2010 |
| JP | 2010257259 A | 11/2010 |
| JP | 2010262275 A | 11/2010 |
| JP | 2011-003537 A | 1/2011 |
| JP | 2011034029 A | 2/2011 |
| JP | 2011-044126 A | 3/2011 |
| JP | 2011-507088 A | 3/2011 |
| JP | 2011047976 | 3/2011 |
| JP | 2012502355 | 1/2012 |
| KR | 10-2003-0017628 | 3/2003 |
| KR | 10-2005-0013578 | 2/2005 |
| WO | 9918590 | 4/1999 |
| WO | 02095342 | 11/2002 |
| WO | 2002095342 | 11/2002 |
| WO | 3107169 | 12/2003 |
| WO | 2007082114 | 7/2007 |
| WO | 2009034982 A1 | 3/2009 |
| WO | 2009-050812 | 4/2009 |
| WO | 2010027565 | 3/2010 |
| WO | 2010027565 A2 | 3/2010 |
| WO | 2010041227 A1 | 4/2010 |
| WO | 2013032584 | 3/2013 |
| WO | 2013165582 | 11/2013 |

OTHER PUBLICATIONS

Takamatsu et al., "Transparent conductive-polymer strain sensors for touch input sheets of flexible displays" Journal of Micromechanics and Microengineering, J. Micromech. Microeng. 20 (2010) 075017 (6pp).
Bhattacharya et al., "Organic LED Pixel Array on a Dome" the IEEE, vol. 93, No. 7, Jul. 2005.
Stedmon et al., "Sound and Tangible Interfaces for Novel product design" Satin, Nov. 2007.
Wagner et al., "Flexible thin-film transistor backplanes" Department of Electrical Engineering, and Princeton Institute for the Science and Technology of Materials.
Rothkopf et al., U.S. Appl. No. 13/171,295, filed Jun. 28, 2011.
Chen et al., U.S. Appl. No. 13/186,238, filed Jul. 19, 2011.
Lynch, U.S. Appl. No. 13/184,303, filed Jul. 15, 2011.
Chen et al., U.S. Appl. No. 13/186,238, filed Jul. 19, 2011. E.
Drzaic et al., U.S. Appl. No. 13/252,971, filed Oct. 4, 2011.
Franklin et al., U.S. Appl. No. 13/250,227, filed Sep. 30, 2011.
Franklin et al., U.S. Appl. No. 13/250,666, filed Sep. 30, 2011.
Franklin et al., U.S. Appl. No. 13/310,409, filed Dec. 2, 2011.
Franklin et al., U.S. Appl. No. 13/422,724, filed Mar. 16, 2012.
Martisauskas et al., U.S. Appl. No. 13/229,120, filed Sep. 9, 2011.
Myers et al., U.S. Appl. No. 13/246,510, filed Sep. 27, 2011.
Raff ei al., U.S. Appl. No. 13/452,061, filed Apr. 20, 2012.
Rappoport et al., U.S. Appl. No. 13/249,734, filed Sep. 30, 2011.
Rappoport et al., U.S. Appl. No. 13/273,851, filed Oct. 14, 2011.
Rothkopf et al., U.S. Appl. No. 13/177,165, filed Jul. 6, 2011.
Concise Description of Relevance of United States Patent Publication No. US 2007-0202917 Submitted Under 35 U.S. 1 C. § 122(E) and 37 C.F.R. § 1.290 submitted Mar. 19, 2013, for U.S. Appl. No. 13/171,295, filed Jun. 28, 2011, 3 pages.
Concise Description of Relevance of United States Patent Publication No. US 2008-0305838 Submitted Under 35 U.S. 2 C. § 122(E) and 37 C.F.R. § 1.290 submitted Mar. 19, 2013, for U.S. Appl. No. 13/171,298, filed Jun. 28, 2011, 3 pages.
Concise Description of Relevance of United States Patent Publication No. US 2006-0238494 Submitted Under 35 U.S. 3 C. § 122(E) and 37 C.F.R. § 1.290 submitted Mar. 19, 2013, for U.S. Appl. No. 13/171,298, filed Jun. 28, 2011,3 pages.
Concise Description of Relevance of United States Patent Publication No. US 2003-0227441 Submitted Under 35 U.S. 4 C. § 122(E) and 37 C.F.R. § 1.290 submitted Mar. 19, 2013, for U.S. Appl. No. 13/171,298, filed Jun. 28, 2011, 3 pages.
Concise Description of Relevance of Japanese Patent Publication No. JP 2003-211087 Submitted Under 35 U.S.C. § 5 122(E) and 37 C.F.R. § 1.290 submitted Mar. 19, 2013, for U.S. Appl. No. 13/171,298, filed Jun. 28, 2011, 3 pages.
Patent Cooperation Treaty Third Party Observation submitted Jun. 14, 2013, for International Patent Application No. PCT/2012/029844 filed on Mar. 20, 2012, 6 pages.
Patent Cooperation Treaty Third Party Observation submitted Jun. 14, 2013, for International Patent Application No. PCT/2012/029844 filed on Mar. 20, 2012, 4 pages.
Patent Cooperation Treaty Third Party Observation submitted Jun. 14, 2013, for International Patent Application No. PCT/2012/029844 filed on Mar. 20, 2012, 3 pages.
Concise Description of Relevance of Japanese Patent Publication No. JP 2001-154592 Submitted Under 35 U.S.C. § 9 122(E) and 37 C.F.R. § 1.290 submitted Mar. 19, 2013, for U.S. Appl. No. 13/184,303, filed Jul. 15, 2011, 5 pages.
Concise Description of Relevance of Japanese Patent Publication No. HEI6-66969 Submitted Under 35 U.S.C. § 122 10 (E) and 37 C.F.R. § 1.290 submitted Mar. 19, 2013, for U.S. Appl. No. 13/184,303, filed Jul. 15, 2011, 3 pages.
Concise Description of Relevance of Japanese Patent Publication No. JP 2003-280548 Submitted Under 35 U.S.C. § 11 122(E) and 37 C.F.R. § 1.290 submitted Mar. 19, 2013, for U.S. Appl. No. 13/184,303, filed Jul. 15, 2011, 4 pages.
Concise Description of Relevance of Japanese Patent Publication No. JP 2000-293117 Submitted Under 35 U.S.C. § 12 122(E) and 37 C.F.R. § 1.290 submitted Mar. 19, 2013, for U.S. Appl. No. 13/184,303, filed Jul. 15, 2011, EI 3 pages.
Concise Description of Relevance of Japanese Patent Publication No. JP 2010-008480 Submitted Under 35 U.S.C. § 13 122(E) and 37 C.F.R. § 1.290 submitted Mar. 19, 2013, for U.S. Appl. No. 13/184,303, filed Jul. 15, 2011, 5 pages.
Concise Description of Relevance of Japanese Patent Publication No. JP 2003-15795 Submitted Under 35 U.S.C. § 14 122(E) and 37 C.F.R. § 1.290 submitted Oct. 3, 2013, for U.S. Appl. No. 13/250,227, filed Sep. 30, 2011, 7 pages.
Concise Description of Relevance of Japanese Patent Publication No. JP 2002-0071082 Submitted Under 35 U.S.C. § 15 122(E) and 37 C.F.R. § 1.290 submitted Oct. 3, 2013, for U.S. Appl. No. 13/250,227, filed Sep. 30, 2011, 5 pages.
Concise Description of Relevance of Japanese Patent Publication No. JP 2008-233779 Submitted Under 35 U.S.C. § 16 122(E) and 37 C.F.R. § 1.290 submitted Oct. 3, 2013, for U.S. Appl. No. 13/250,227, filed Sep. EI 30, 2011, 5 pages.
Concise Description of Relevance of Japanese Patent Publication No. JP 2010-171620 Submitted Under 35 U.S.C. § 17 122(E) and 37 C.F.R. § 1.290 submitted Oct. 3, 2013, for U.S. Appl. No. 13/250,227, filed Sep. EI 30, 2011, 5 pages.

(56) References Cited

OTHER PUBLICATIONS

Toda, Thinking of Whether to Buy of Not, The Greatest Smartphone, Singlehandedly "No Match" for the iPhone 4 (32 GB), Nikkei PC21, Nikkei BP, Jul. 24, 2010, No. 15, vol. 14, pp. 148-151.

* cited by examiner

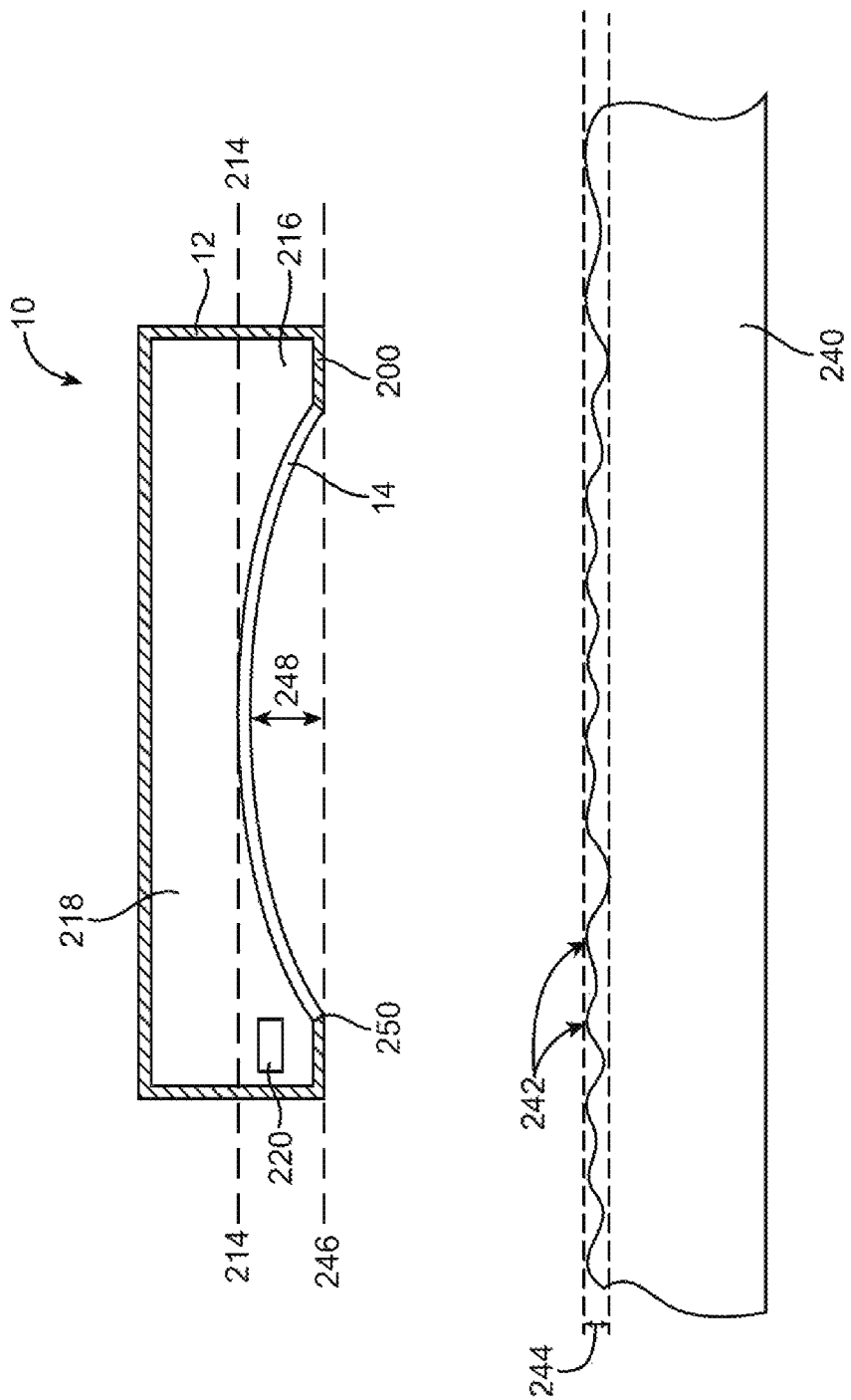

ELECTRONIC DEVICES WITH CONCAVE DISPLAYS

This application is a continuation of U.S. patent application Ser. No. 13/108,256, filed May 16, 2011, which claims the benefit of provisional patent application No. 61/454,936, filed Mar. 21, 2011, both of which are hereby incorporated by reference herein in their entireties.

BACKGROUND

This relates generally to displays, and more particularly, to electronic devices with displays.

Electronic devices such as portable computers and cellular telephones are often provided with displays. For example, a liquid crystal display (LCD) may be formed from a stack of display structures such as an thin-film transistor layer with display pixels for providing visual information to a user, a color filter layer for providing the display pixels with color, a touch screen panel for gathering touch input from a user, and a cover glass layer for protecting the display and internal components.

Devices with planar cover glass layers may be prone to scratches and damage when dropped on a surface. Users can minimize scratches and damage from drop events using a protective case. Protective cases may not, however, be convenient or aesthetically appealing for many users.

It would therefore be desirable to be able to provide improved displays for electronic devices.

SUMMARY

Electronic devices may be provided with concave displays. Peripheral edge portions of a concave display may be raised relative to depressed central portions of the concave display. This helps reduce scratches and other damage due to contact with the central portion of the display.

Concave displays may include one or more flexible display layers and may be mounted on top of or under a cover layer. For example, a flexible display layer may be mounted on top of a rigid support member or may be mounted on the underside of a rigid cover layer.

Concave displays may also include touch-sensitive capabilities by stacking a touch sensor array layer on top of or under flexible display layers. Rigid concave displays may be formed from a flexible display layer, a touch-sensitive layer, and a rigid cover layer or rigid support structure.

Devices having concave displays formed from curved flexible display layers may help maximize the use of the internal volume of an electronic device.

Further features of the invention, its nature and various advantages will be more apparent from the accompanying drawings and the following detailed description of the preferred embodiments.

BRIEF DESCRIPTION OF THE DRAWINGS

FIG. 7 is a cross-sectional side view of an illustrative electronic device having a concave display with a radius of curvature chosen to protect the device from a drop surface in accordance with an embodiment of the present invention.

DETAILED DESCRIPTION

An electronic device may be provided with a concave display. The concave display may include a flexible display layer that has been bent to curve the display.

Concave displays may be formed from flexible layers such as a flexible display layer (e.g., a flexible organic light-emitting diode array), a flexible touch-sensitive layer (e.g., a sheet of polymer with an array of transparent capacitor electrodes for a capacitive touch sensor), a flexible substrate layer, etc. These flexible layers may, if desired, be covered by a flexible or rigid cover layer (sometimes referred to as a cover glass) or may be supported by a support structure (e.g., a rigid support structure on the underside of the flexible layers). In electronic devices with concave displays that are covered by rigid cover layers, the cover layers may be provided with openings that provide access to the flexible layers of the display. For example, a cover glass layer may have an opening that allows a button member to move relative to the cover glass layer. As the button member moves within the opening, underlying portions of the flexible display may be deformed (e.g., to allow actuation of an associated switch).

Electronic devices may also be provided with user interface components (input-output components) such as buttons, microphones, speakers, piezoelectric actuators or (for receiving electrical input from a user or tactile feedback to users), other actuators such as vibrators, pressure sensors, and other components. These components may be mounted under portions of a flexible display.

User interface components may be mounted under the flexible display or may be integrated into the flexible display. The deformable nature of the flexible display may allow a user to interact with the user interface components (input-output components) by moving the display into contact with the user interface components or by otherwise allowing the display to locally flex (e.g., to allow sound to pass through the flexible display or to allow barometric pressure measurements of the exterior environment to be made by an internal pressure sensor). If desired, a portion of the flexible display may form a membrane portion of an electrical component. Components that may be provided with a membrane that is formed from a portion of a flexible display include microphones, laser microphones, pressure sensors, speakers, etc.

Concave displays formed from flexible and rigid layers that all have concave shapes (i.e., displays formed from a collection of layers in which no layer of the display is planar) may provide reduced vulnerability to damage during a drop event in which an electronic device strikes the ground or other external objects while maximizing the internal volume of the device that is available to hold electrical and mechanical device components.

Figure 1:
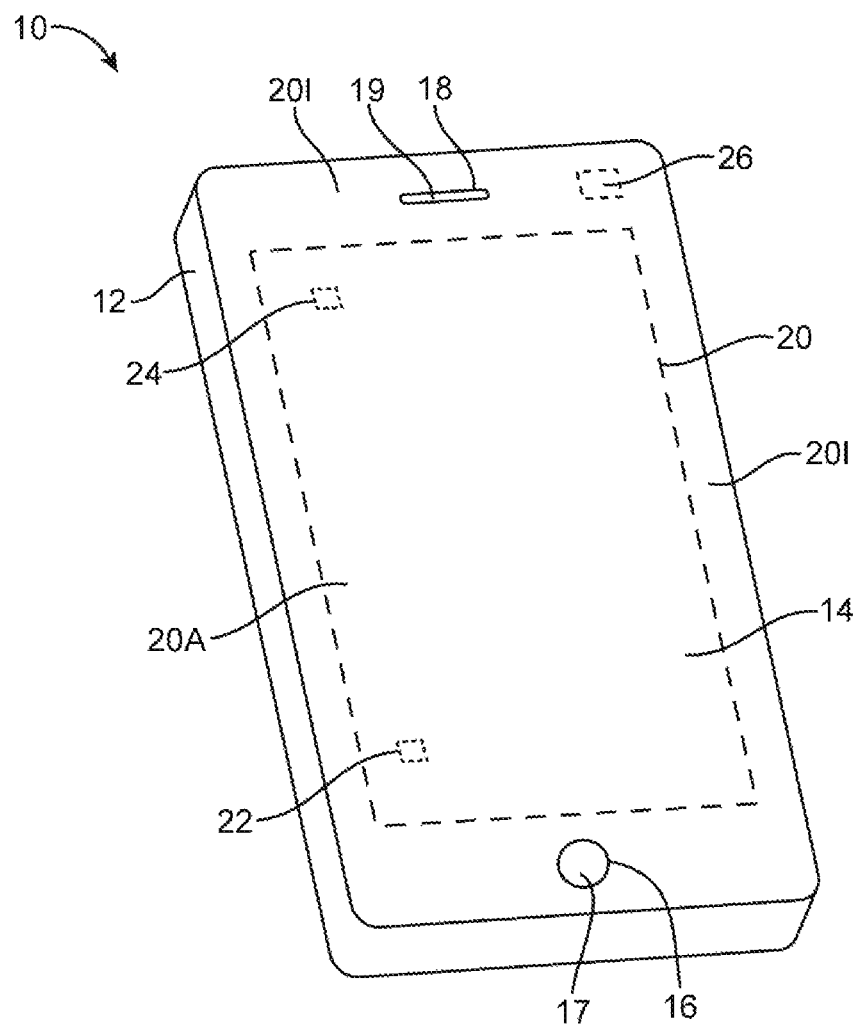
FIG. 1 is a perspective view of an illustrative electronic device with a concave display and internal components in accordance with an embodiment of the present invention.

An illustrative electronic device of the type that may be provided with a concave display is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a concave display such as concave display 14. Concave display 14 may be formed from multiple layers of material. These layers may include a touch sensor layer such as a layer on which a pattern of indium tin oxide (ITO) electrodes or other suitable transparent electrodes have been deposited to form a capacitive touch sensor array or a touch sensor layer formed using other touch technologies (e.g., resistive touch, acoustic touch, optical touch, etc.). These layers may also include a layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array containing rows and columns of OLED display pixels. Other types of flexible display pixel arrays may also be formed (e.g., electronic ink displays, etc.). The use of OLED technology to form flexible display 14 is sometimes described herein as an example. This is, however, merely illustrative. Flexible display 14 may be formed using any suitable flexible display technology. The use of flexible displays that are based on OLED technology is merely illustrative.

In addition to these functional display layers (i.e., the OLED array and the optional touch sensor array), display 14 may include one or more structural layers. For example, display 14 may be covered with a flexible or rigid cover layer and/or may be mounted on a support structure (e.g., a rigid support). Layers of adhesive may be used in attaching flexible display layers to each other and may be used in mounting flexible display layers to rigid and flexible structural layers.

In configurations for display 14 in which the cover layer for display 14 is flexible, input-output components that rely on the presence of flexible layers may be mounted at any suitable location under the display (e.g., along peripheral portions of the display, in a central portion of the display, etc.). In configurations for display 14 in which the flexible layers are covered by a rigid cover glass layer or other rigid cover layer, the rigid layer may be provided with one or more openings and the electronic components may be mounted under the openings. For example, a rigid cover layer may have openings such as a circular opening 16 for button 17 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

In some embodiments, portions of concave display 14 such as peripheral regions 20I may be inactive and portions of display 14 such as rectangular central portion 20A (bounded by dashed line 20) may correspond to the active part of display 14. In active display region 20A, an array of image pixels may be used to present text and images to a user of device 10. In active region 20A, display 14 may include touch sensitive components for input and interaction with a user of device 10. If desired, regions such as regions 20I and 20A in FIG. 1 may both be provided with display pixels (i.e., all or substantially all of the entire front planar surface of a device such as device 10 may be covered with display pixels).

Device 10 may, if desired, have internal user interface components such as buttons 17 or speaker component 19 that occupy openings such as openings 16 and 18 respectively in an optional rigid cover layer of concave display 14. Buttons 17 may be based on dome switches or other switch circuitry. Buttons 17 may include button members that form push buttons (e.g., momentary buttons), slider switches, rocker switches, etc. Device 10 may include internal structural components such as structural component 22 that add a raised structure to a portion of concave display 14. Device 10 may include components such as interface components 24 and 26 that may be fully internal to device 10, but that receive input from the user or from the surrounding environment through physical interaction with concave display 14. Interface components 22, 24, and 26 may be positioned in active region 20A or inactive region 20I of concave display 14. Interface components 22, 24, and 26 may be positioned separately from one another or may be commonly located to form a combined component with structural and internal features. Interface components 24 and 26 may be positioned underneath concave display 14 so that concave display 14 must be deformed in order to contact components 24 or 26 or, if desired may be positioned to remain in constant contact with concave display 14.

Figure 2:
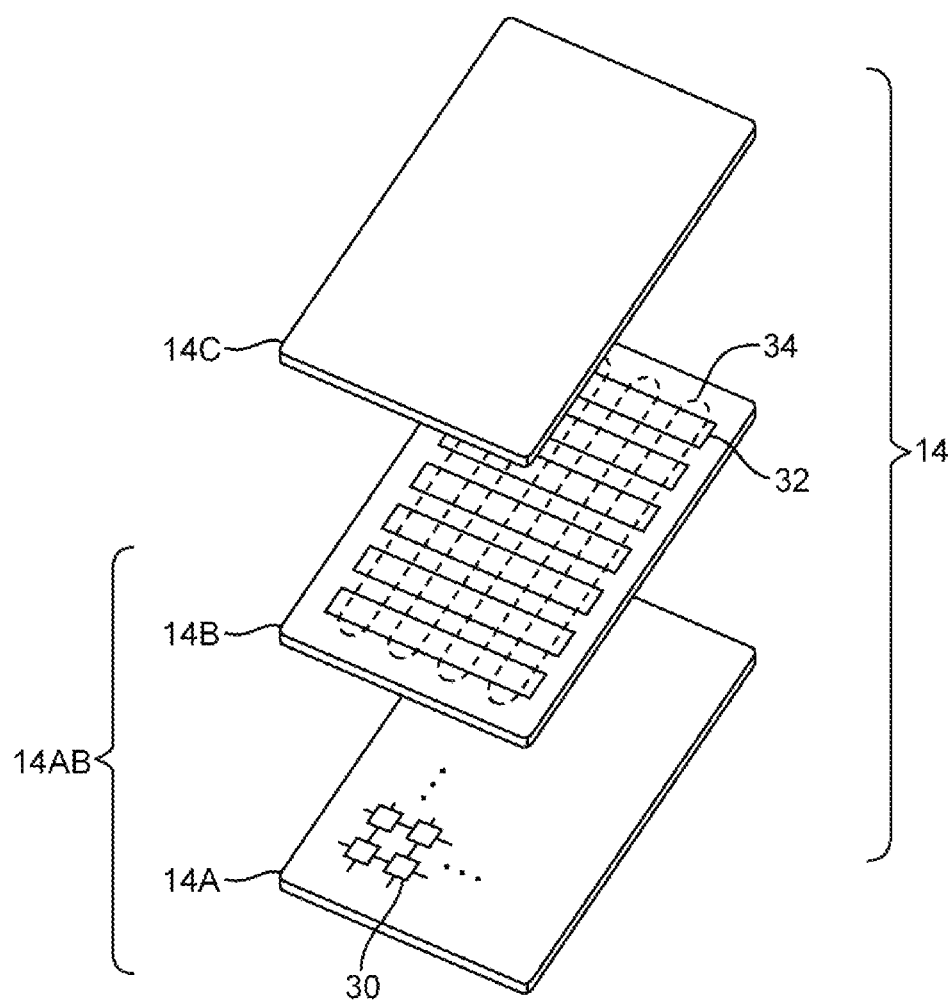
FIG. 2 is a diagram of an illustrative set of display layers that make up a concave display in accordance with an embodiment of the present invention.

An exploded perspective view of an illustrative display is shown in FIG. 2. As shown in FIG. 2, concave display 14 may be formed by stacking multiple layers including flexible display layer 14A, touch-sensitive layer 14B, and cover layer 14C. Display 14 may also include other layers of material such as adhesive layers, optical films, or other suitable layers. Flexible display layer 14 may include image pixels formed form light-emitting diodes (LEDs), organic LEDs (OLEDs), plasma cells, electronic ink elements, liquid crystal display (LCD) components, or other suitable image pixel structures compatible with flexible displays.

Touch-sensitive layer 14B may incorporate capacitive touch electrodes such as horizontal transparent electrodes 32 and vertical transparent electrodes 34. Touch-sensitive layer 14B may, in general, be configured to detect the location of one or more touches or near touches on touch-sensitive layer 14B based on capacitive sensors, resistive sensors, optical sensors, acoustic sensors, inductive sensors, or force sensors.

Software and/or hardware may be used to process the measurements of the detected touches to identify and track one or more gestures. A gesture may correspond to stationary or non-stationary, single or multiple, touches or near touches on touch-sensitive layer 14B. A gesture may be performed by moving one or more fingers or other objects in a particular manner on touch-sensitive layer 14B such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Cover layer 14C may be formed from plastic or glass (sometimes referred to as display cover glass) and may be flexible or rigid. If desired, the interior surface of peripheral inactive portions 201 of cover layer 14C may be provided with an opaque masking layer on such as black ink.

Touch-sensitive flexible display section 14AB may be formed from display pixel array layer 14A and optional touch sensor layer 14B.

Figure 3:
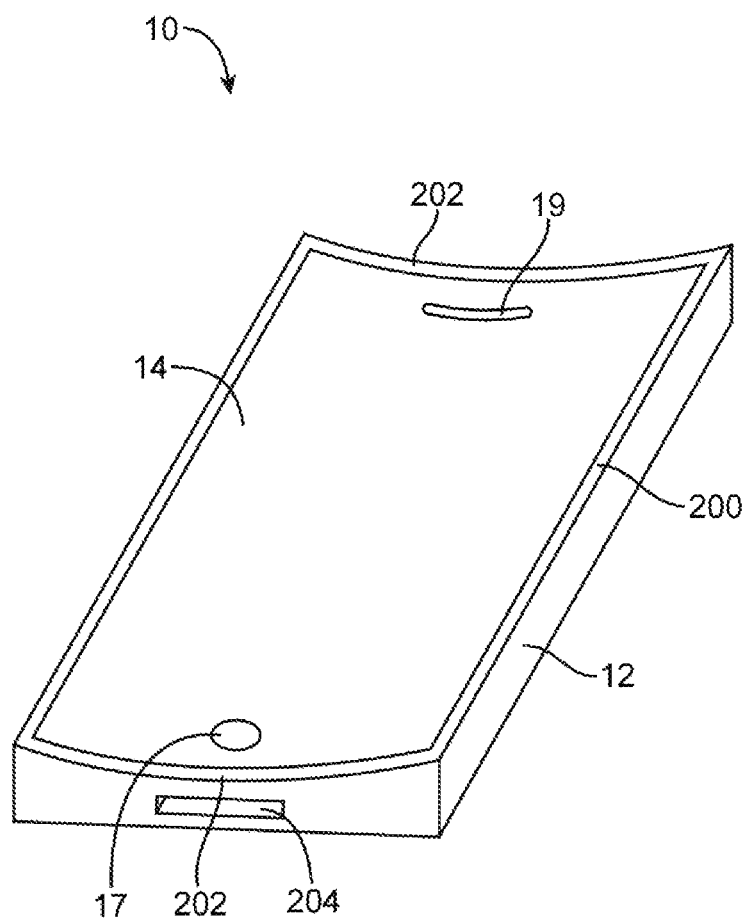
FIG. 3 is a perspective view of an illustrative electronic device with a concave display and a bezel in accordance with an embodiment of the present invention.

FIG. 3 is perspective view of an illustrative embodiment of device 10 with concave display 14 in which device 10 is provided with a bezel such as bezel 200 surrounding the periphery of concave display 14. In the illustrative embodiment shown in FIG. 3, housing 12 of device 10 has an opening 204 that may provide access to a data port. The surface of bezel 200 may be formed in-plane with the surface of display 14 (i.e., so that bezel 200 and display 14 form a single smooth surface) or may be formed at a right angle to the walls of housing 12 (as examples). Bezel 200 may be a separate bezel member or may be formed as a portion of housing 12. As shown in FIG. 3, top and bottom portions 202 of bezel 200 may have a concave (curved) shape that matches the cross-sectional curved shape of concave display 14.

Figure 4:
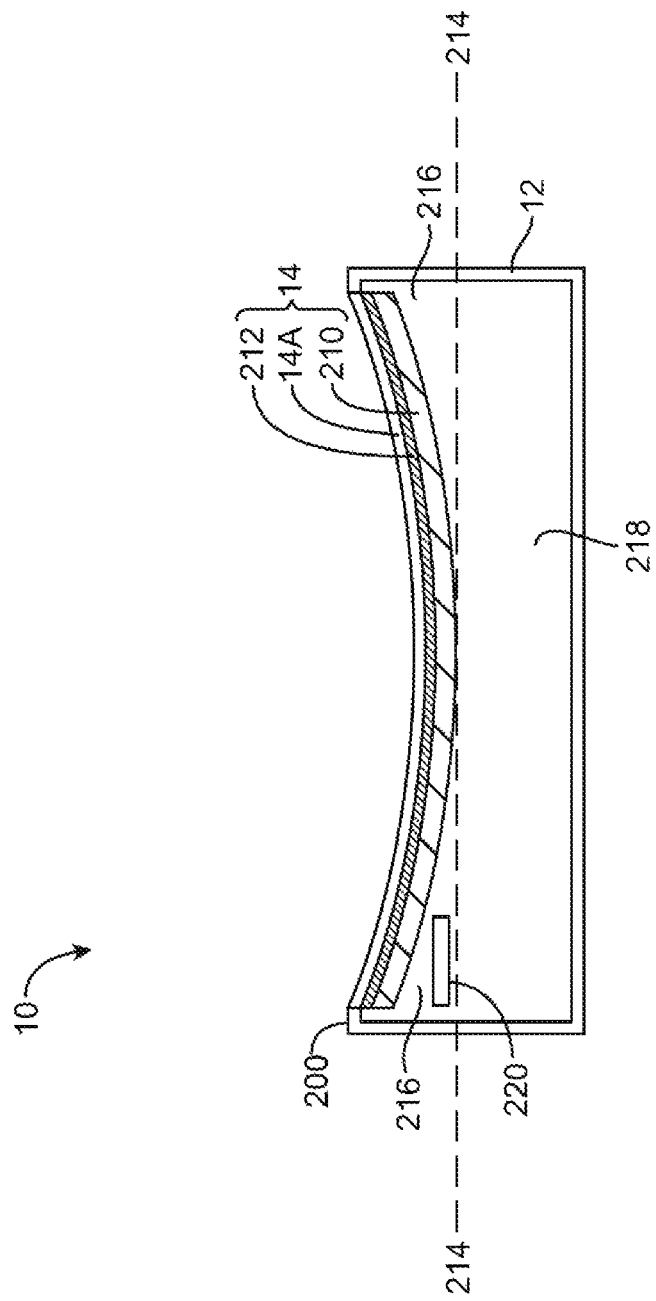
FIG. 4 is a cross-sectional side view of an illustrative electronic device having a concave display with a flexible display layer that conforms to the concave shape of a support structure in accordance with an embodiment of the present invention.

FIG. 4 is a cross-sectional side view of an illustrative embodiment of device 10 in which concave display 14 is formed by mounting flexible display layer 14A to a concave support structure such as support structure 210 (e.g., a rigid support structure having at least a concave external surface such as a metal, glass, or plastic support structure) using a layer of adhesive material such as adhesive layer 212. As shown in FIG. 4, the internal volume of device 10, defined by housing 12, bezel 202 and concave display 14 may include volume 216 above a plane (indicated by dashed line 214) defined by the deepest point in the curvature of display 14. This is because the inner surface of support structure 210 is convex (in the FIG. 4 example). Volume 216 provides space in addition to rectangular volume 218 in which internal components such as component 220 (e.g., printed circuit boards, antennas or other components) may be positioned. The ability to bend flexible display 14 into the concave shape of FIG. 4 may therefore help maximize the interior space that is available within device 10 to mount device components.

Figure 5:
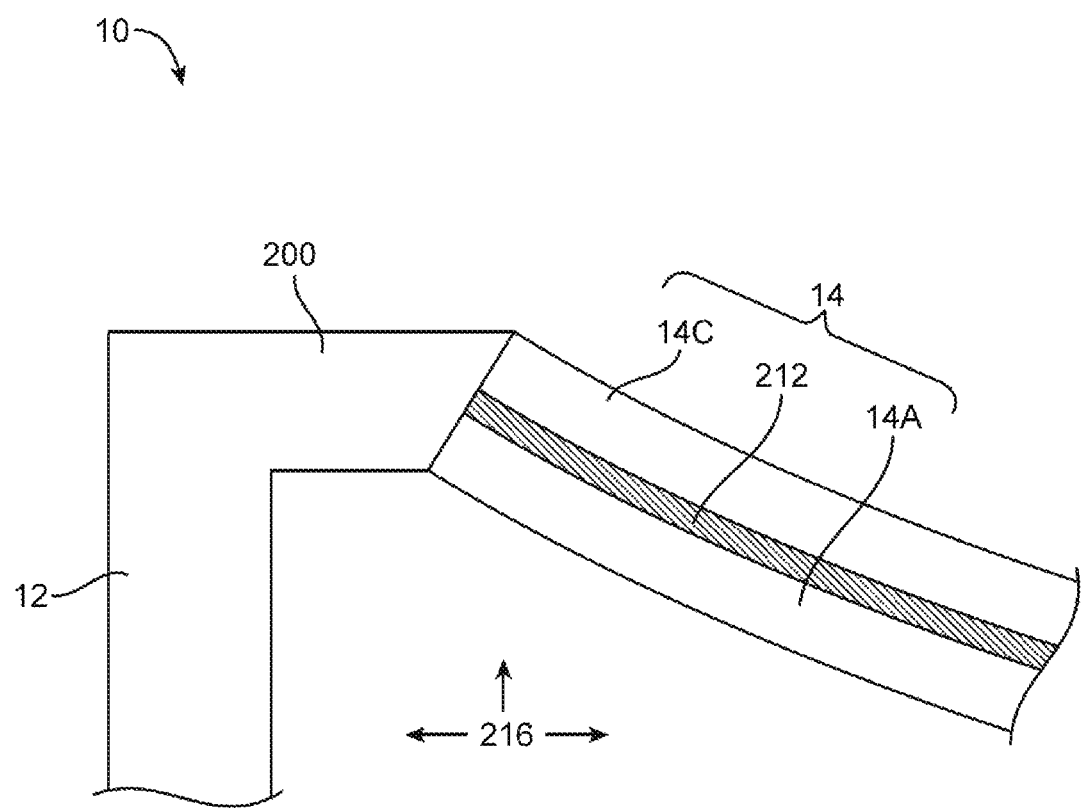
FIG. 5 is a cross-sectional side view of a portion of an illustrative electronic device having a cover layer and a flexible display layer joined by an adhesive layer in accordance with an embodiment of the present invention.

FIG. 5 is a cross-sectional side view of a portion of device 10. In the illustrative embodiment of FIG. 5, concave display 14 is formed from flexible display layer 14A, adhesive layer 212, and rigid cover layer 14C (e.g., a layer of rigid plastic or a layer of rigid cover glass having a concave external surface and a convex inner surface to which flexible display layer 14A conforms). Concave display 14 may be formed adjacent to bezel portion 200 of housing 12 or may be joined to housing 12 by an additional mounting member. The concave shape of cover layer 14C of display 14 may provide reduced susceptibility to damage if device 10 is dropped. Forming flexible display layer 14A in a shape that matches the concave shape of cover layer 14C (i.e., so that layer 14A conforms to the convex inner surface of layer 14C) may provide additional internal volume 216 to device 10.

Figure 6:
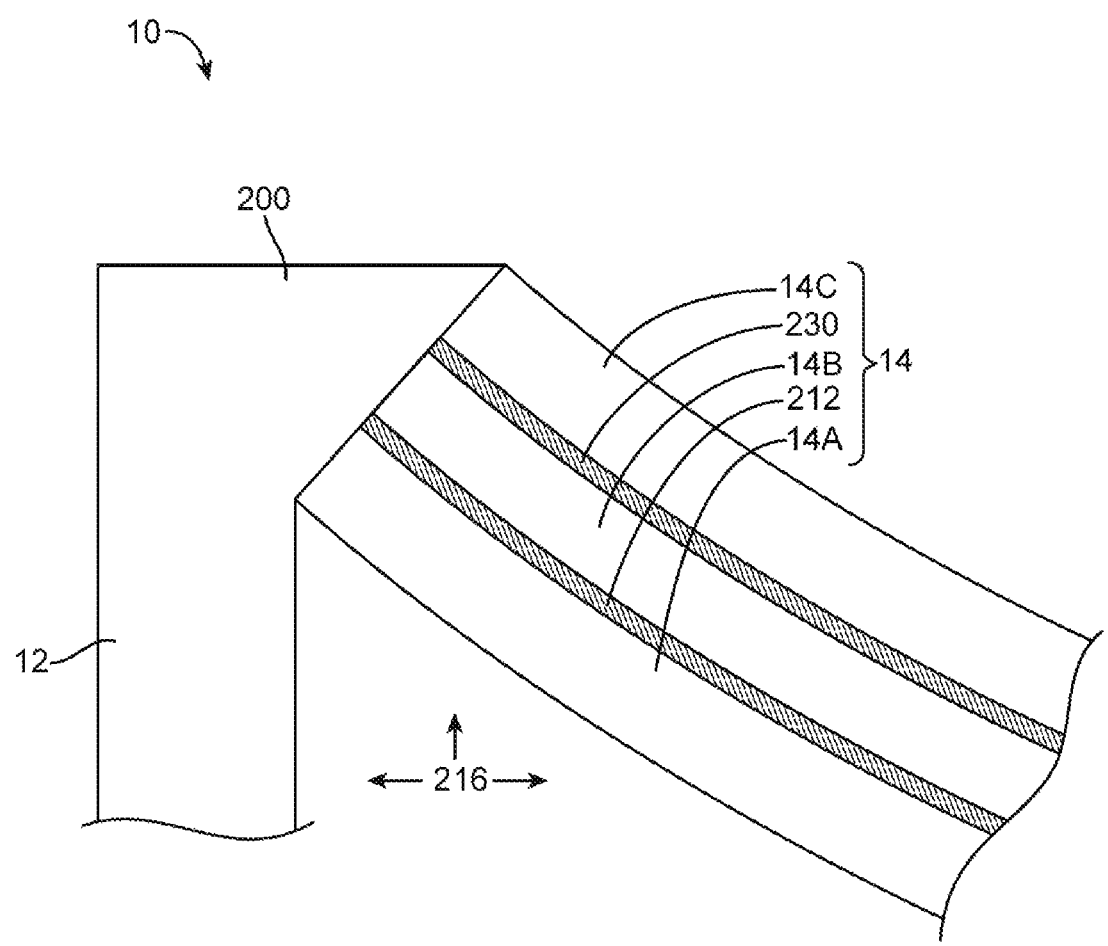
FIG. 6 is a cross-sectional side view of a portion of an illustrative electronic device having a flexible display layer, a flexible touch-sensitive layer, and a cover layer joined by adhesive layers in accordance with an embodiment of the present invention.

FIG. 6 is a cross-sectional side view of a portion of another embodiment of device 10. In the illustrative embodiment of FIG. 6, concave display 14 is formed from flexible display layer 14A attached to optional touch-sensitive layer 14B by adhesive layer 212. Touch-sensitive layer 14B may further be attached to rigid cover layer 14C (e.g., a glass or plastic layer) using adhesive layer 230 such that all layers (212, 14B, 230, and 14C) of display 14 conform to the concave shape of cover layer 14C. Concave display 14 may be directly adjacent to bezel portion 200 of housing 12 or may be joined to housing 212 by an additional mounting member. The concave shape of all layers (14A, 212, 14B, 230, and 14C) of display 14 may provide reduced susceptibility to damage in the event that device 10 is dropped and may provide additional internal volume 216.

FIG. 7 is a cross-sectional side view of device 10 and a common drop surface such as drop surface 240 (e.g., sidewalk concrete, asphalt, tile, or any other surface) on which device 10 may be dropped. Drop surface 240 may have a surface roughness due to surface features such as surface features 242. Surface features 242 may have a characteristic height such as height 244 (e.g., 1-2 mm for a concrete surface). As shown in FIG. 7, device 10 may be provided with concave display 14. Concave display 14 may be provided with a curvature defined by maximum depth 248 defined by the distance from the outermost surface of device 10, indicated by dashed line 246 and the deepest point in the curvature of display 14 (indicated by dashed line 214). The outermost surface of device 10 may be defined by bezel 200, or, in the absence of bezel 200, may be defined by juncture point 250 at which the peripheral edges of display 14 meet housing 12.

Maximum depth 248 may be chosen to be larger than characteristic size 244 of surface features 242 of common drop surface 240. Providing device 10 with a concave display having curvature chosen to provide a maximum depth (depth 248) that is larger than characteristic height 244 may significantly reduce the risk of damage (e.g., scratches or other damage) to device 10 during a drop event.

Providing concave display 14 with flexible display layer 14A capable of conforming to the shape of cover layer 14C allows all layers of display 14 to be conformed to same concave shape. Providing device 10 with concave display 14 in which all layers of concave display 14 conform to the same concave shape may reduce the susceptibility of device 10 to damage when dropped on common drop surface 240 while providing additional internal volume 216 in which internal components may be positioned.

The foregoing is merely illustrative of the principles of this invention and various modifications can be made by those skilled in the art without departing from the scope and spirit of the invention.

What is claimed is:
1. An electronic device, comprising:
a housing;
a flexible display layer mounted to the housing, wherein the flexible display layer has a pixel array with first and second portions and wherein the flexible display layer is operable in a bent configuration in which the first portion bends toward the second portion;
a rigid transparent cover layer through which the first and second portions of the pixel array display images, wherein the rigid transparent cover layer has an inner surface with a bend and wherein the flexible display layer is adhered to the inner surface and conforms to the bend;

a metal support structure having an upper surface that supports the flexible display layer and having an opposing lower surface, wherein the metal support structure has first and second rigid portions, wherein the first rigid portion bends toward the second rigid portion when the flexible display layer is in the bent configuration; and electrical components mounted behind the lower surface of the metal support structure.

2. The electronic device defined in claim 1 further comprising:
a flexible touch-sensitive layer having first and second touch-sensitive regions, wherein the first touch-sensitive region bends toward the second touch-sensitive region when the flexible display layer is in the bent configuration.

3. The electronic device defined in claim 2 wherein the flexible touch-sensitive layer comprises an array of capacitive touch sensor electrodes.

4. The electronic device defined in claim 1 wherein at least part of the housing is curved.

5. The electronic device defined in claim 4 wherein the flexible display layer has a curvature when the flexible display layer is in the bent configuration, and wherein the housing has a curvature that matches the curvature of the flexible display layer.

6. The electronic device defined in claim 1 further comprising an opaque masking layer on an inner surface of the rigid transparent cover layer.

7. The electronic device defined in claim 1 further comprising an input component, wherein the input component receives user input through local deformations of the flexible display layer.

8. The electronic device defined in claim 1 further comprising a force sensor that detects pressing on the flexible display layer.

9. A display operable in a bent configuration, comprising:
a rear housing wall;
a support layer;
a display layer having first and second display regions, wherein the first display region bends relative to the second display region and the display layer flexes in localized regions;
a touch-sensitive layer comprising an array of capacitive touch sensor electrodes;
a rigid transparent cover layer through which the first and second display regions display images, wherein the display layer and the touch-sensitive layer are interposed between the support layer and the rigid transparent cover layer, and wherein when the display is in the bent configuration, the support layer, the display layer, the array of capacitive touch sensor electrodes, and the rigid transparent cover layer flex about a single common axis; and
electrical components mounted between the rear housing wall and the support layer.

10. The display defined in claim 9 wherein the display layer locally deforms in response to user input.

11. The display defined in claim 9 wherein the touch-sensitive layer comprises a force sensor.

12. The electronic device defined in claim 9 wherein the support layer comprises metal.

13. An electronic device, comprising:
a flexible display layer having first and second display regions and a flexible capacitive touch-sensitive layer that are operable in a bent state in which the first display region bends toward the second display region, wherein the flexible display layer and the flexible capacitive touch-sensitive layer locally deform in response to user input;
a rigid transparent cover layer through which the first and second display regions display images;
a support structure, wherein the flexible display layer is interposed between the rigid transparent cover layer and the support structure and wherein the support structure has first and second rigid portions that bend toward one another when the flexible display layer is in the bent state;
a rear housing wall; and
electrical components between the rear housing wall and the support structure.

14. The electronic device defined in claim 13 wherein the flexible display layer comprises an array of organic light-emitting diode pixels.

15. The electronic device defined in claim 13 further comprising an input component that receives the user input through the flexible display layer.

16. The electronic device defined in claim 13 wherein the transparent cover layer comprises plastic.

17. The electronic device defined in claim 13 wherein the transparent cover layer comprises glass.

18. The electronic device defined in claim 13 wherein the support structure comprises metal.

* * * * *